(No Model.) 2 Sheets—Sheet 2.

J. B. GREER.
APPARATUS FOR PURIFYING WATER.

No. 567,829. Patented Sept. 15, 1896.

Witnesses:
F. L. Ourand
Jo. L. Coombs

Inventor:
James B. Greer

Attorneys.

UNITED STATES PATENT OFFICE.

JAMES B. GREER, OF PITTSBURG, PENNSYLVANIA.

APPARATUS FOR PURIFYING WATER.

SPECIFICATION forming part of Letters Patent No. 567,829, dated September 15, 1896.

Application filed May 21, 1896. Serial No. 592,439. (No model.)

*To all whom it may concern:*

Be it known that I, JAMES B. GREER, a citizen of the United States, and a resident of Pittsburg, in the county of Allegheny and State of Pennsylvania, have invented certain new and useful Improvements in Apparatus for Purifying Water; and I do hereby declare that the following is a full, clear, and exact description of the invention, which will enable others skilled in the art to which it appertains to make and use the same, reference being had to the accompanying drawings, which form a part of this specification.

My invention relates to apparatus for purifying water in which certain materials or ingedients are introduced into the water which chemically combine with the sulfates, carbonates, chlorids, and other deleterious substances contained in the water and which tend to form scale in and corrode steam-boilers, converting them into harmless, insoluble salts, which are precipitated to the bottom of the tank in which such action takes place.

The object of the present invention is to provide an improved construction whereby the chemicals or purifying materials are thoroughly mixed with the water and the insoluble salts precipitated.

The invention consists in the novel construction and combination of parts hereinafter fully described and claimed.

Figure 1:
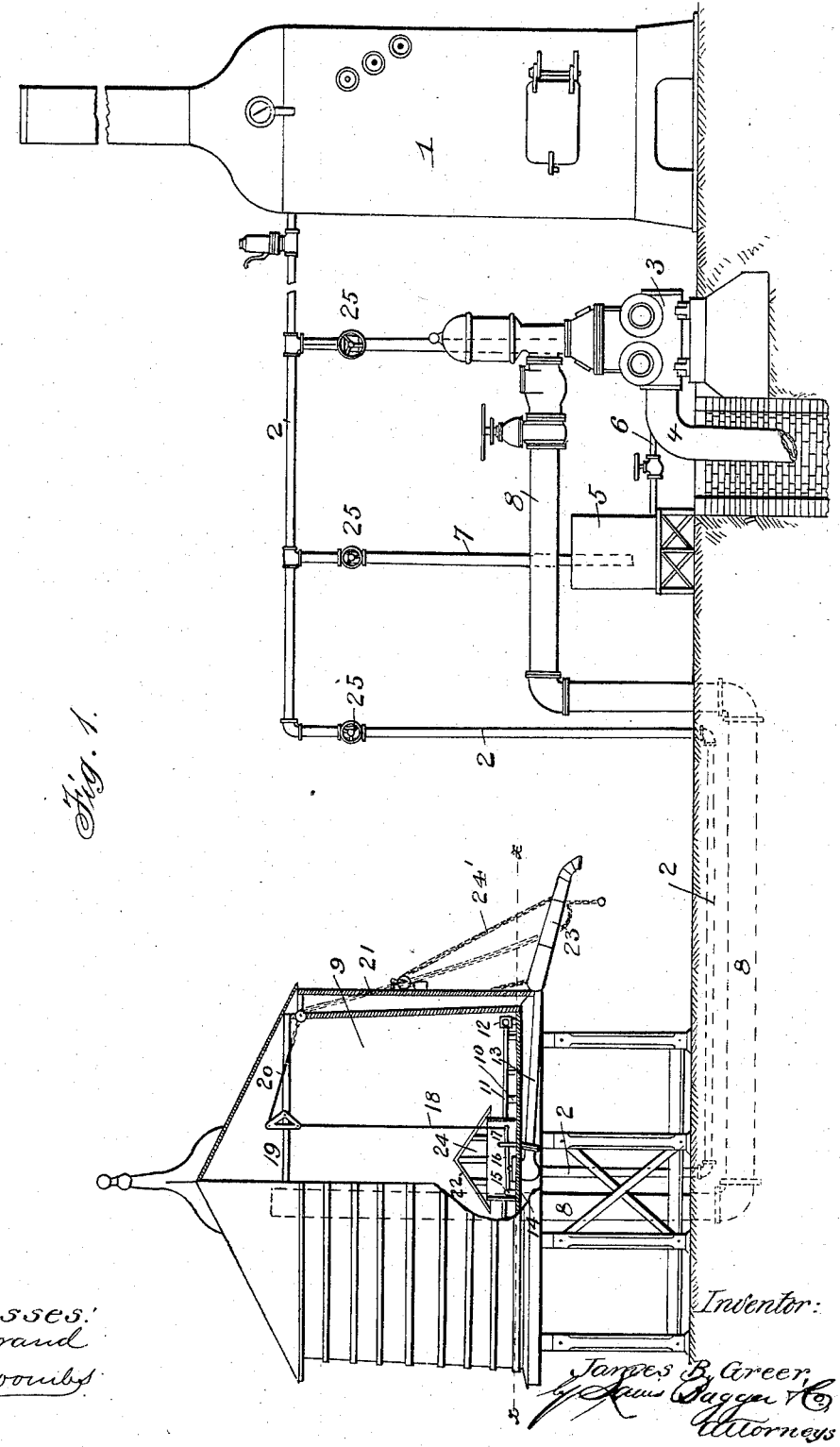
Figure 2:
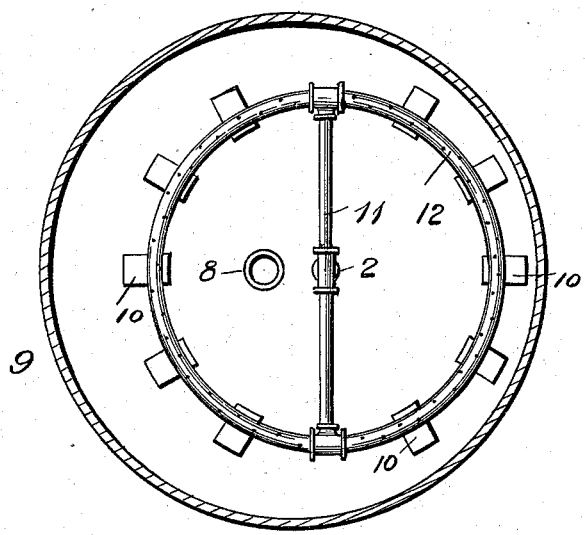
Figure 3:
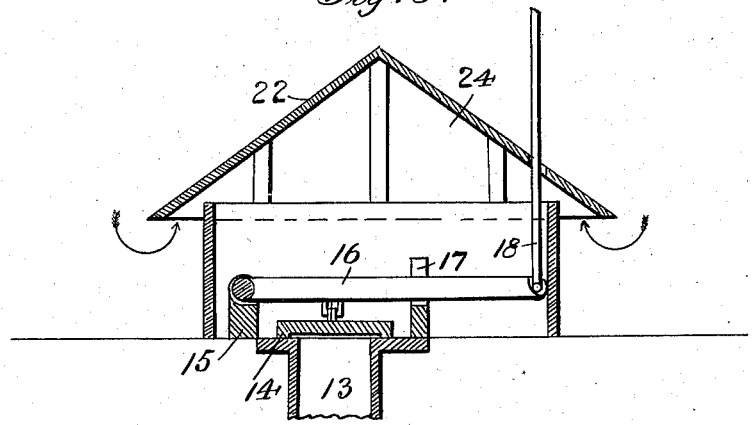

In the accompanying drawings, Figure 1 is an elevation, partly in section, of an apparatus for purifying water according to my invention, showing the same as in use at a railway-station for supplying the purified water to locomotive-boilers. Fig. 2 is a horizontal section of the purifying-tank on the line $x$ $x$, Fig. 1. Fig. 3 is a detail sectional view of the outlet-valve and its housing.

In the said drawings the reference-numeral 1 designates a steam-boiler, of any suitable construction, provided with a steam-pipe 2, leading to a steam-pump 3.

The numeral 4 designates the suction-pipe of the pump, and 5 a receptacle or vessel connected with said suction-pipe by a pipe 6. Leading to this vessel or tank is a pipe 7, connected with the steam-pipe 2 for heating the water with which the chemicals are mixed, so as to insure thorough dissolving of the same.

The numeral 8 designates the outlet-pipe of the steam-pump, through which water containing the chemicals is supplied to an elevated tank 9. The said tank 9 may be of any ordinary or suitable construction, and the pipe 8 extends up through the bottom thereof to or near the top of the same. The steam-pipe 2 also extends up centrally through the bottom of said tank a short distance above the same and is provided with a horizontal pipe 11, connected with a circular pipe 12, supported above the bottom of the tank by blocks 10. This circular pipe on its upper side is formed with a number of equidistant holes to allow the steam to escape into the tank and agitate the water and chemical contained therein.

The numeral 13 designates the outlet-pipe to the tank, provided with a valve 14, pivoted to a lug 15. This valve is provided with a rod 16, working in a guide 17, and is provided with a rod 18, connected with a bell-crank lever 19, the other end of which has connected with it rods 20 and chains 21 for operating the same.

The numeral 22 designates a conical roof, which forms the top of a rectangular housing 24, surrounding the said valve.

The numeral 23 designates a spout hinged to the outer pipe for supplying a locomotive-tender with purified water and is provided with a chain 24' for holding it in position. Stop cocks or valves 25 are connected with the steam-pipes at suitable points.

The operation is as follows: The purifying chemicals with a proper supply of water are placed in the tank or receptacle 5 and the pump set in operation. Steam is then supplied to the pipe 2 from the boiler, which will heat the water in the receptacle, causing the chemicals to more readily dissolve. The steam-pump is also set in operation, which will raise the water from the well or other source of supply and draw it into the pump with the water and chemicals from said receptacle. From the pump the water will now be forced to the tank and the steam from the pipe also escaping thereinto through the perforations in the rings, will agitate the water, causing the chemicals to be thoroughly mixed therewith and combined with the deleterious substances containng in the water, converting them into insoluble salts, which will be immediately precipitated into the bottom of the tank.

It is obvious that hot air may be employed instead of steam to agitate the water in the tank, as the effect is purely a mechanical one.

While I show and describe my invention as used for supplying purified water to locomotive engines or tenders, it is obvious that it may be employed in connection with stationary engines or for other purposes, and that many modifications in the details of construction may be made without departing from the principle thereof. For instance, instead of feeding the water and chemicals together to the purifying-tank the water may be pumped thereinto and the chemicals fed from a receptacle located above the tank, the essential feature being the agitation of the water and chemicals in the purifying-tank by steam or air jets for rapidly precipitating the deleterious substances contained in the water. Again, the jet-pipe instead of being circular may be made angular, and the same effect may be produced by the use of perforated radial pipes, either straight or curved, the inner ends of which are connected with the air or steam pipe. The housing located above the outlet-valve may be filled or packed with moss, hay, excelsior, or other filtering media for preventing the precipitate from escaping with the water, or the outlet may be located in the side of the tank above the bottom of the same, so as to draw the water from the tank above the precipitate.

Having thus fully described my invention, what I claim is—

1. In an apparatus for purifying water, the combination with the boiler and steam-pump, the receptacle for containing water and chemicals, the pipe connecting the same with the suction-pipe of the pump, and the steam-pipe having a branch pipe, leading to the pump, of the elevated tank and the pipe extending from the pump to said tank and terminating near the upper end thereof, and the steam-pipe being also connected with the tank at the lower end thereof, substantially as described.

2. In an apparatus for purifying water, the combination with the boiler and steam-pump, the receptacle for containing water and chemicals, the pipe connecting the same with the suction-pipe of the pump, and the steam-pipe having branch pipes leading to the said pump and receptacle, of the elevated tank, the pipe extending from the pump to said tank and terminating near the upper end thereof, the pipes located in said tank provided with perforations and connected with said steam-pipe, substantially as described.

3. In an apparatus for purifying water, the combination with the boiler and steam-pump, the receptacle for containing water and chemicals, the pipe connecting the same with the suction-pipe of the pump, and the steam-pipe having branch pipes leading to the said pump and receptacle, of the elevated tank, the pipe extending from the said pump to said tank and terminating near the upper end thereof, the pipes located in said tank provided with perforations and connected with said steam-pipe, the outlet-pipe, the pivoted valve, the rectangular housing having a conical top and the bell-crank lever and connections, substantially as described.

In testimony that I claim the foregoing as my own I have hereunto affixed my signature in presence of two witnesses.

JAMES B. GREER.

Witnesses:
CHARLES DOHRER,
I. M. BERRY.